US006047942A

United States Patent [19]
Kennedy

[11] Patent Number: 6,047,942
[45] Date of Patent: Apr. 11, 2000

[54] GENERATOR SET BRACKET ASSEMBLY

[76] Inventor: Gino W. Kennedy, 800 SE. 7th Ave., Pompano Beach, Fla. 33060

[21] Appl. No.: 09/157,871

[22] Filed: Sep. 21, 1998

[51] Int. Cl.[7] .................... F16M 13/00
[52] U.S. Cl. .................... 248/674
[58] Field of Search .................... 248/674, 675, 248/676, 678

[56] References Cited

U.S. PATENT DOCUMENTS 4,899,703 2/1990 Buferne .................... 248/674 X
5,765,805 6/1998 Kennedy .................... 248/674

*Primary Examiner*—Ramon O. Ramirez
*Attorney, Agent, or Firm*—McHale & Slavin PA

[57] ABSTRACT

A generator support bracket assembly for securing a generator assembly to the side of a conventional engine. The assembly includes an engine/generator mounting plate providing a base plate between the generator and engine. An engine mount for securing the engine to isolation mounts. A generator mount for securing the generator to isolation mounts. And an engine back plate to properly position the starter motor in relation to the generator assembly to provide a lightweight and compact generator set.

24 Claims, 5 Drawing Sheets

GENERATOR SET BRACKET ASSEMBLY

FIELD OF THE INVENTION

This invention is directed to the field of generator sets, and in particular, to a generator set bracket assembly for use in securing a generator to the side of a conventional diesel engine providing a compact, lightweight, generator set with a four-point mounting structure.

BACKGROUND OF THE INVENTION

Generators are used to convert mechanical energy into electrical energy. Portable generator sets are formed from internal combustion engines which are coupled to a motor rotated to produce electricity. Such a device is commonly used to provide electricity in remote locations and allow for the operation of conventional electrical equipment such power tools, refrigerators, televisions, air conditioners, and so forth.

Generator sets can be permanently mounted in recreational and marine vessels so as to provide electrical power when the vessel is moving or while at a location where electrical power is unavailable. Such installations require that the generator is sized to handle a particular electrical load in accordance with the demands of a vessel. For instance, if a marine vessel has a 16,000 BTU air conditioner, an average draw of 20 amps can be expected. If multiple air conditioners or other electrical items such as hot water heaters, refrigerators and so forth are also operated simultaneously, the amperage draw requires a larger generator set. Failure to provide an adequate energy supply force can result in low voltage being delivered to the energy driven items causing an overload condition or possible damage to each of the energy driven sources depending upon their tolerance for low voltage. For example, if multiple electrical components are driven from the same generator set, and an inadequate amount of electricity is provided causing sensitive computer controlled electronics may be irreparably damaged. While the tendency is to provide the largest generator as possible, the disadvantage is associated weight and the amount of space consumed by the installation. The allowable space on a recreational vehicle or marine vessel is critical and must be conserved if the maximal amount of livable space is to be enjoyed. In such situations, it is not uncommon for a designer to reduce the size of the generator to accommodate a particular spacial environment which can lead to the aforementioned problems.

In addition, the designer must accommodate for the weight of larger generators as even a few hundred pounds can cause a problem if improperly positioned. Adding a generator set to the rear of a small marine vessel, such as a 35 foot boat, can result in handling problems if the weight is not balanced properly.

In a marine setting the normal vibration from an engine and generator assembly can cause structural problems and requires absolute rigidity between the engine and generator if the vibration is to be isolated. For this reason, marine vessels require the engine and generator combination to mounted on heavy base plates in an effort to provide the rigidity necessary. A flexible belt is then used between the components which typically includes an automatic adjustment to maintain belt tension. The base plate must also be rigid enough to secure the engine and generator while the vessel is moving or in heavy seas.

In an attempt to accommodate these problems, manufacturers have attempted to reduce weight by use of lightweight metals, but have not reduced the need for the baseplate, belt tensioning device, or the large volume of space necessary for mounting. U.S. Pat. No. 5,765,805 discloses a low profile generator bracket that employs a horizontal engine in combination with a direct bolted generator. This generator set accomplishes a number of items previously needed including the elimination of the base plate and the associated weight, however, the low profile generator set is limited to small amperage demands.

Thus, what is lacking in the art is a vertical generator set that allows for the direct coupling of a generator to an engine for minimizing space, weight and vibration.

SUMMARY OF THE INVENTION

The instant invention is a bracket assembly kit for use with an internal combustion engine to allow for the direct coupling of a generator. In the preferred embodiment, a spacing bracket is bolted to one side of an engine with the generator bolted to the spacer bracket. The opposite side of the generator employs a mount for supporting a side of the engine\generator and a second mount is coupled to the engine for support of the opposite side of the engine/generator assembly. In addition, a starter bracket is used for positioning of a starter motor in a location remote from the generator, so as to allow access to the starter fly-wheel.

The assembly allows in one embodiment a 5.0 kilowatt output at 2800 rpm when a generator is coupled to a liquid cooled diesel Kubota, 29.23 cubic inch displacement engine. The 5.0 kilowatt engine/generator has an overall length of 23 inches, a 17 inch width, and a 20 inch height. The weight of the assembly approximates 210 pounds.

In a second embodiment a 7.5 kilowatt output is obtained from a liquid cooled diesel Kubota engine producing 43.88 cubic inches providing a length, width and height identical to the 5.0 kilowatt generator with overall weight of approximately 290 pounds.

Thus, an objective of the instant invention is to provide a compact generator set which eliminates the need for a common horizontal base plate by use of a bracket assembly that allow the engine and generator to be supported along opposite ends with a common mounting bracket bolted to the engine.

Yet still another objective of the instant invention is to provide a direct coupling of the generator to an engine wherein the use of a tooth style belt eliminates the need for belt adjustment.

Still another objective of the instant invention is to teach the use of angular brackets for use in mounting the generator/engine assembly.

Still another objective of the instant invention is to disclose the shape of a starter bracket that allows for proper positioning of an engine starter so as to provide sufficient room for positioning of a generator.

Yet another objective of the instant invention is to provide a 5 and 7.5 kilowatt generators that are more compact and lightweight than conventional 1800 or 3600 rpm generator assemblies.

Yet another objective of the instant invention is to operate a diesel engine at peak torque providing efficiency for generator output and fuel economy.

And still another objective of the instant invention is to provide a rigid platform by elimination of combined platform to the bolting of the generator assembly directly to the side of the engine.

Yet still another objective is to eliminate the need for belt adjustment by making the assembly between the generator and the engine an unchangeable fixed distance.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
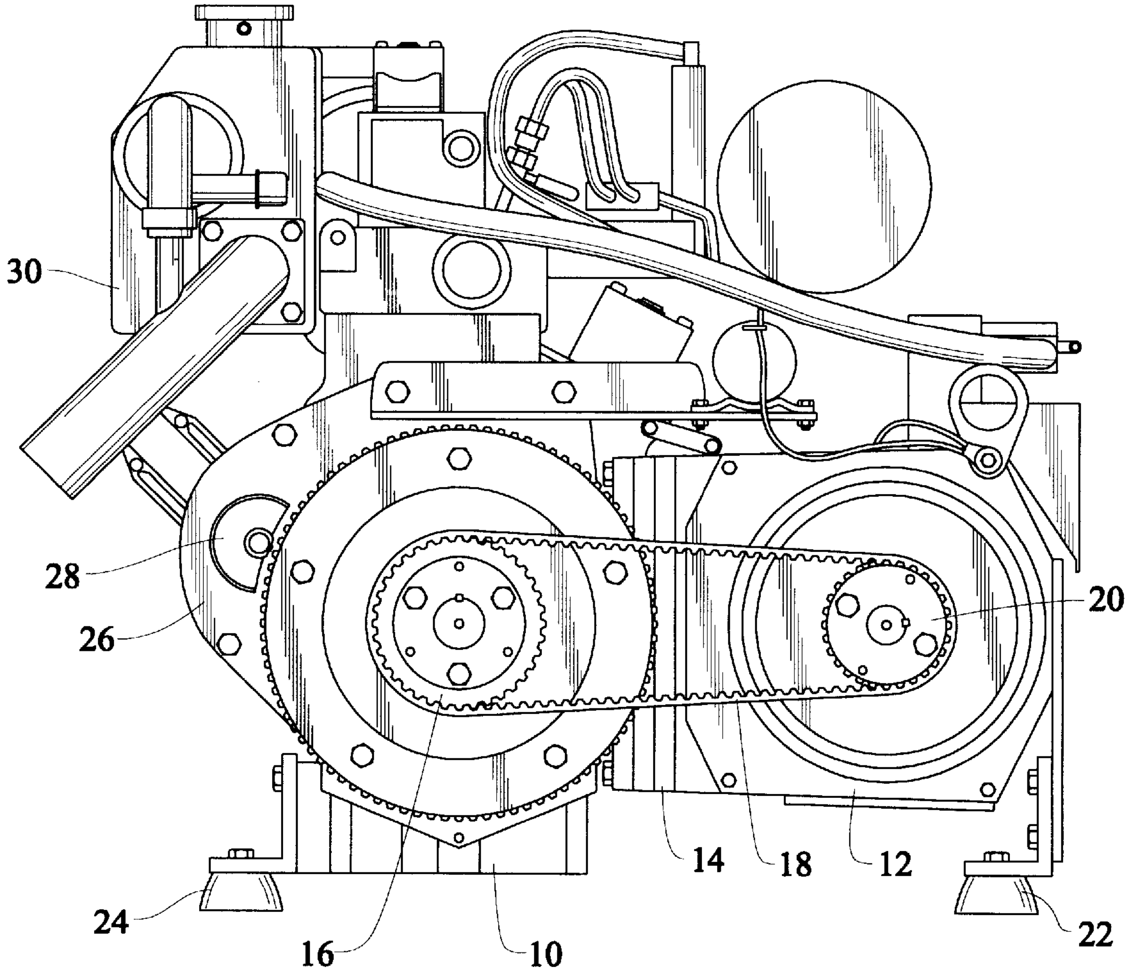
FIG. 1 is a pictorial view of a vertical engine with a generator assembly mounted directly to the side of the engine by use of the instant generator assembly support brackets.

Now referring to FIG. 1, set forth is a conventional vertical diesel engine 10, with the preferred embodiment of this invention directed to the Kubota diesel engine having a displacement range between 29.23 cu. in., to 43.88 cu. in. with a maximum output range of 12½ Hp to 18.8 Hp. This invention is directed to, although not limited to, the vertical four cycle liquid cooled diesel having a centrifical fly-wheel mechanical type governor as sold under Kubota model Z482-E; D662-E; and D722-E. FIG. 1 depicts the engine 10 having a generator assembly 12 coupled to the side of the engine by use of the engine\generator mounting plate 14 bolted directly to the side of the engine. The generator assembly 12 is bolted to the plate and thus directly to the engine. The engine drives a synchronized sprocket 16 for rotation of a flexible belt 18 for rotational action of synchronized sprocket 20 located on the generator assembly 12. Generator mount 22 and engine mount 24 each incorporate engine isolators that allow for a near vibration free assembly when secured to a rigid base such as the floor of a marine vessel or recreational vehicle. In this embodiment an engine backplate 26 is provided for moving of the starter motor 28 from a conventional location on the side of the engine to an opposite side as depicted beneath exchanger 30. The result is the use of a generator assembly capable of producing 5.0 kilowatts with overall dimensions of 23 inches by 17 inches wide by 20 inches high.

Figure 3:
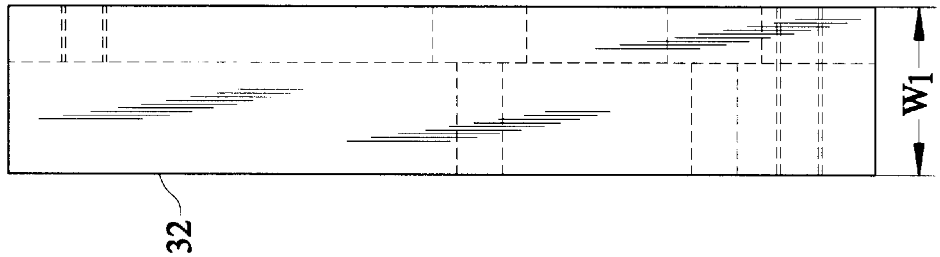
FIG. 3 is a side view of FIG. 2.
Figure 2:
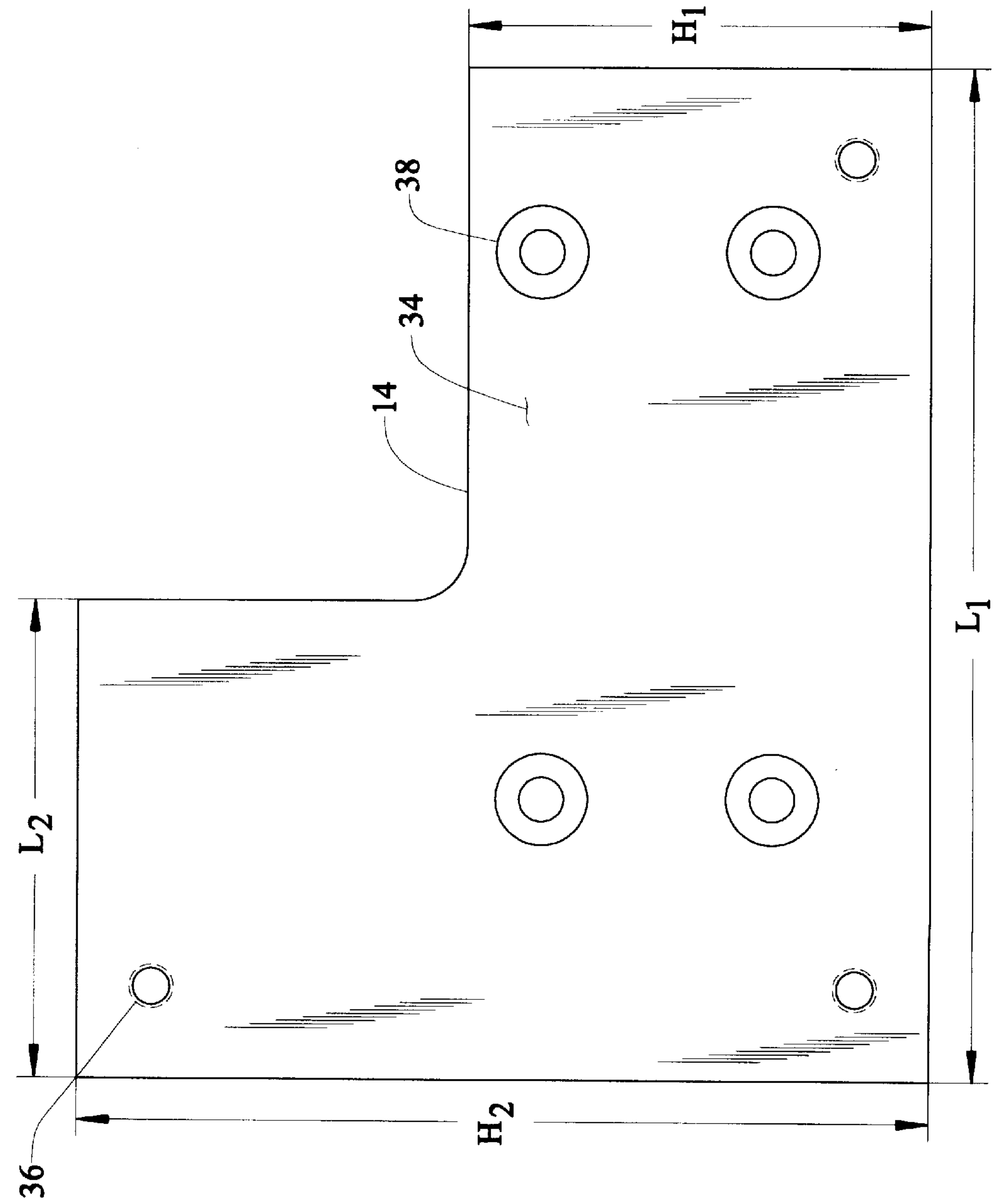
FIG. 2 is a front view of the engines\generator mounting plate.

Now referring to FIGS. 2 and 3, set forth is the engine generator mounting plate 14, formed from a rigid plate of aluminum having an engine side surface 32 and a generator side surface 34. A first set of thru-holes 36 are strategically positioned for aligning said engine side surface 34 in a vertical orientation wherein the use of mounting bolts, not shown, allow for securing of the engine generator plate 14 in a fixed position directly to the side of the engine. The second set of thru-holes 38 are strategically positioned for accepting a generator assembly shown as numeral 12 and FIG. 1 to said generator side surface wherein mounting bolts are used for securing the generator assembly in a fixed positioned to the engine generator mounting plate. The engine generator mounting plate 14 has a length $L_1$ approximately 9 inches with $L_2$ is approximately 4¼ inches. The spacial distance allows a three point mounting stance to the generator with 4 centrally disposed bolts for securing to the engine. For use on the Kubota engines height $H_1$ is approximately 4 inches so as not to interfere with the current location for the water pump and associated hoses. Height $H_2$ of approximately 7½ inches providing sufficient width for support of the generator assembly. The width of the engine generator mounting plate $W_1$ is approximately 1.47 inches providing the required separation between the generator assembly and the engine for various existing components as well as sufficient depth for tapping the mounting holes used for mounting the generator mounting plate.

Figure 5:
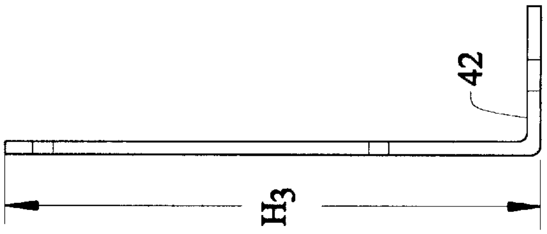
FIG. 5 is a side view of FIG. 4.
Figure 4:
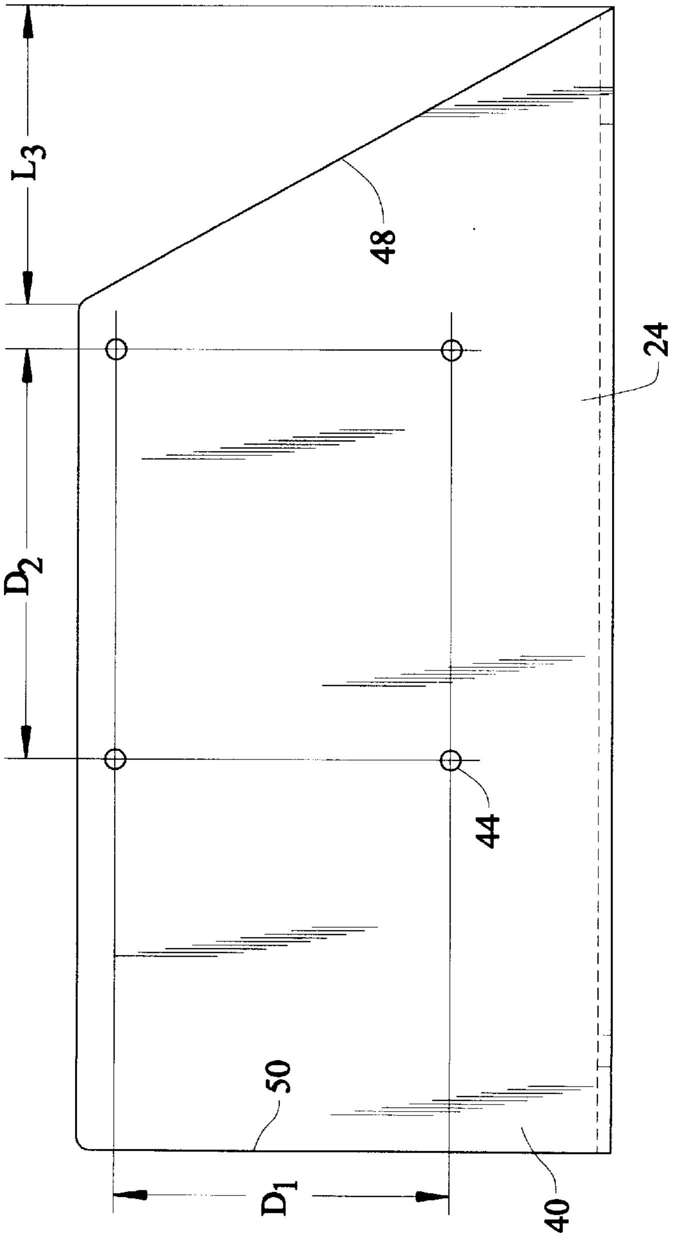
FIG. 4 is a front plane view of the generator mount.
Figure 6:
FIG. 6 is a top view of FIG. 4.

Referring to FIGS. 4–6, set forth is engine mount 24 which is formed from the vertical member 40 and a horizontal member 42. The vertical member 40 includes mounting holes 44 available for securing the engine mount directly to the side of an engine. The horizontal member 42 includes mounting holes 46 for use in securing the isolation mounts which are then securable to the base of a vessel. The engine mount 24 is formed from a single piece of rigid angle steel having a thickness of about 3/16th of an inch. The vertical member includes a first side edge 48 which is formed inwardly angular to the horizontal member 42. The height of the engine mount $H_3$ is 7.5 inches with a dimensional aspect of $D_1$ approximately 110 mm and $D_2$ stated at 140 mm. The inwardly angular shape is formed by the first side edge cut inwardly approximately 3.9 inches as depicted by $L_3$. The width $W_2$ of the horizontal component is approximately 2 inches and the overall length of the horizontal component which forms the basis of support of the engine by use of the isolation mounts is 15 inches as depicted by $L_4$.

Figure 8:
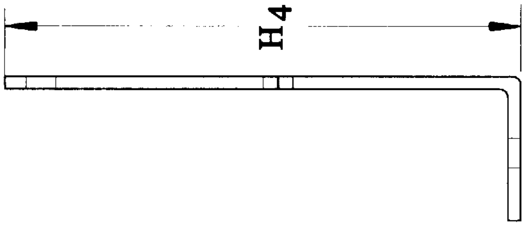
FIG. 8 is an end view of FIG. 7.
Figure 7:
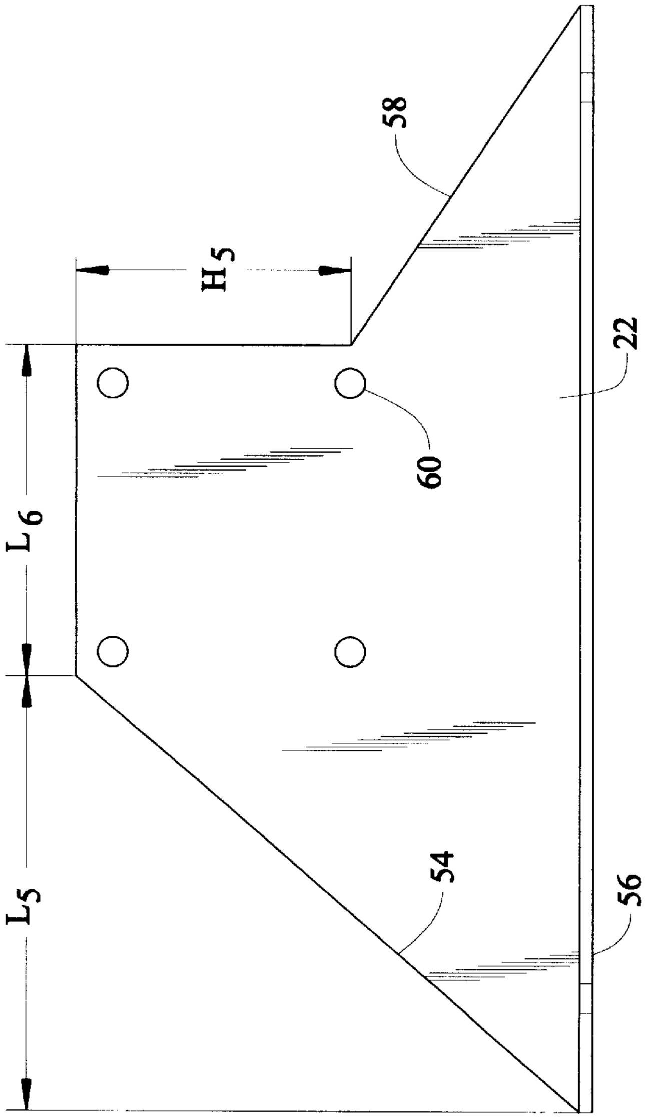
FIG. 7 is a front plane view of the generator mount.
Figure 9:
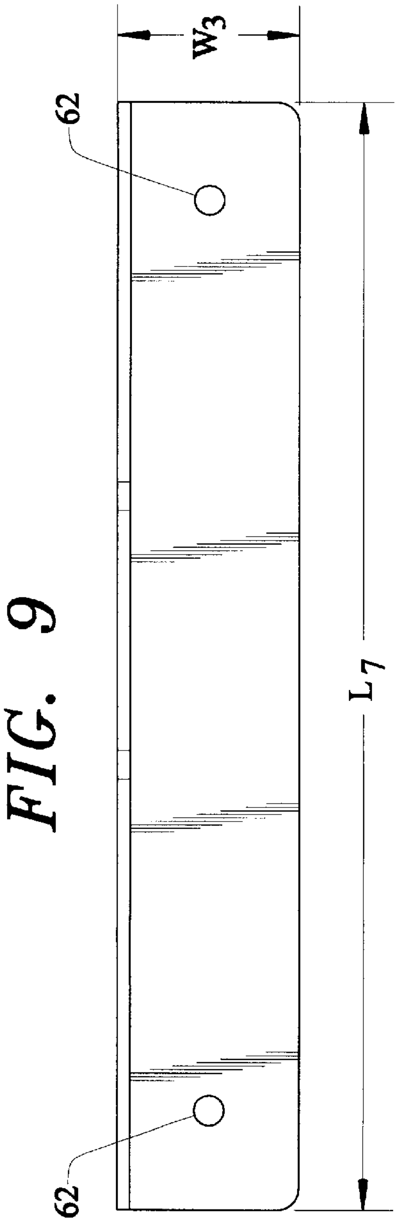
FIG. 9 is a top view of FIG. 7.

FIGS. 7–9 depict the generator mount 22 formed from a single piece of rigid steel having a thickness of approximately 3/16th of an inch with a first side edge 54 formed inwardly angular to a horizontal component 56 forming a slope of approximately 4.5 inches, depicted by $L_5$, with the height of the vertical component $H_4$ at 5.52 inches. A second side edge 58 which is angled inwardly in a position approximately 2½ as depicted in $H_5$from the top of the plate. The top of the plate measures approximately 6.3 inches. The overall length $L_7$of the lower component is 15 inches and is approximately 2 inches wide as depicted by $W_3$. Mounting holes 60 allow the plate 22 to be secured to the side of the engine and mounting holes 62 provide support of the lower component to isolation mounts which are then used to secure the unit to the floor of a vessel. It is noted that only three mounting holes are needed for the generator. In this embodiment, a Marcom Generator is employed with one mounting leg removed.

Figure 10:
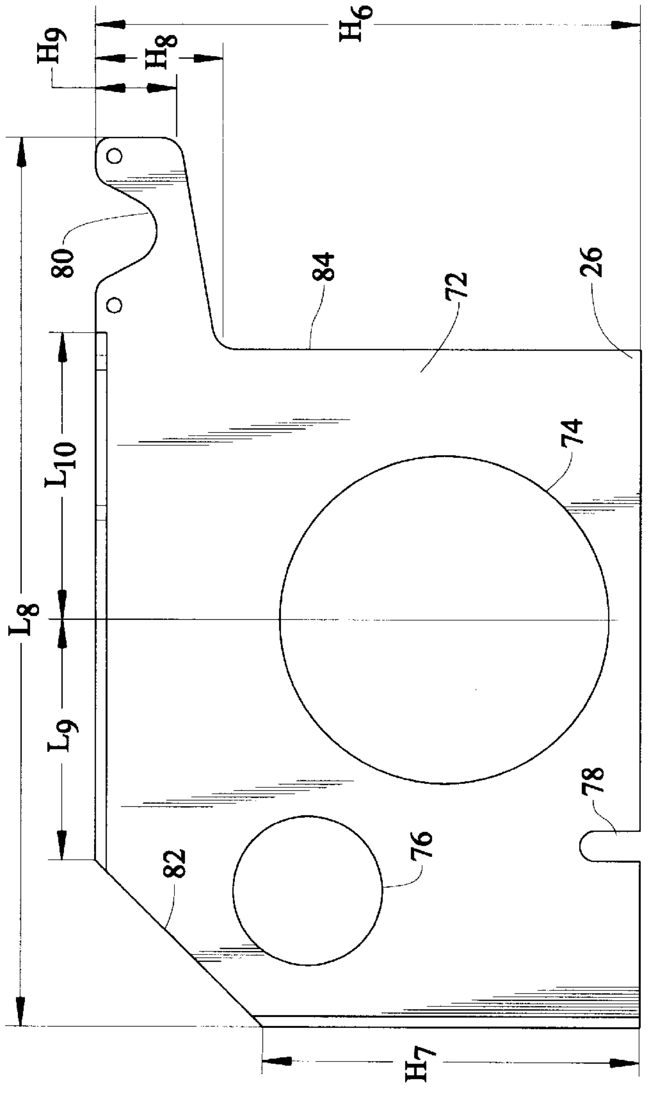
FIG. 10 is a front plane view of an engine back plate.
Figure 11:
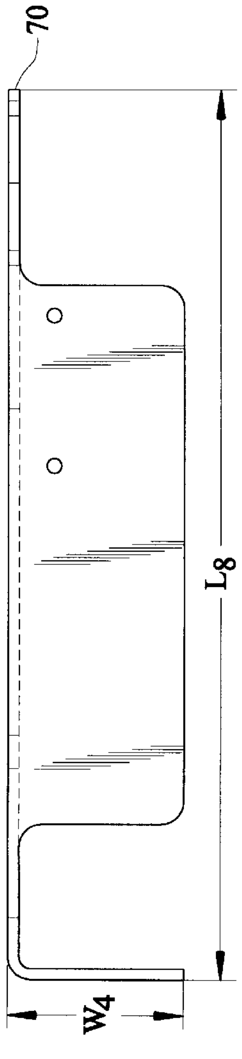
FIG. 11 is a top view of FIG. 10.

FIGS. 10 and 11 illustrate an engine back plate 26 constructed from a rigid metal plate having an inner surface 70 positionable against the engine and an outer surface 72. Crankshaft opening 74 is sized for placement around the crankshaft of the engine wherein a flywheel, shown in FIG. 1, may be secured to the shaft. A starter motor opening 76 may be used for positioning of the starter motor in a position beneath the heat exchanger of a Kubota engine, providing sufficient space for placement of the generator assembly along an opposite side. The starter motor positioned for engagement of the toothed flywheel mounted to said crankshaft. The length $L_8$ is 14.5 inches, with $L_9$ approximately 3.75 inches and $L_{10}$ approximately 4.75 inches. The height of the bracket $H_6$ is approximately 8.75 inches along one edge and 6.0 inch height $H_7$ along the opposite edge. The cutout 78 provides a lip for placement over the engine bracket for mounting of a fuel pump and guard shield, and curvature 80 allows for mounting of a rung solenoid. It is noted that the angular cut along edge 82 and shaped edge 84 are required for accommodating the heat exchanger and generator assembly, respectively.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A generator support bracket assembly for securing a generator assembly to the side of a conventional engine, comprising:

an engine/generator mounting plate having an engine side surface with a first set of through holes strategically positioned for aligning said plate in a vertical orientation to an engine employing mounting bolts for securing said plate in a fixed position and a second side surface having a second set of through holes strategically positioned for accepting a generator assembly to said plate with mounting bolts for securing said generator assembly in a fixed position;

an engine mount having a vertical member with mounting holes positioned for securing to said engine and a horizontal member with mounting holes available for securing said engine mount to isolation mounts; and a generator mount having a vertical member with mounting holes positioned for securing to said generator and a horizontal member with mounting holes available for securing said generator mount to isolation mounts.

2. The generator support bracket assembly according to claim 1 wherein said engine/generator plate is constructed from at least one plate of metal with a total thickness of about 1.5 inches.

3. The generator support bracket assembly according to claim 2 wherein said engine/generator plate is constructed from aluminum.

4. The generator support bracket assembly according to claim 1 wherein said engine mount is formed from a single piece of rigid angle steel having a thickness of about 3⁄16 inch.

5. The generator support bracket assembly according to claim 4 wherein said engine mount vertical member includes a first side edge formed inwardly angular to said horizontal member, and a second side edge having a first portion formed inwardly angular to said horizontal member and a second portion formed perpendicular to said horizontal member.

6. The generator support bracket assembly according to claim 1 wherein said vertical member of said engine mount has a height of about 5.25 inches and said horizontal member of said engine mount has a length of about 15 inches.

7. The generator support bracket assembly according to claim 1 wherein said generator mount is formed from a single piece of rigid angle steel having thickness of about 3⁄16 inch.

8. The generator support bracket assembly according to claim 7 wherein said generator mount vertical member includes a first side edge formed perpendicular to said horizontal member, and a second side edge formed inwardly angular to said horizontal member.

9. The generator support bracket assembly according to claim 1 wherein said vertical member of said generator mount has a height of about 7.5 inches and said horizontal member of said engine mount has a length of about 15 inches.

10. The generator support bracket assembly according to claim 1 wherein said engine rotates a generator shaft on said generator assembly by use of a synchronous belt and socket.

11. The generator support bracket assembly according to claim 1 including an engine back plate constructed from a rigid metal plate having an opening for a crankshaft and an opening for a starter motor, said starter motor opening strategically positioned to permit placement of said starter motor in a position for engagement of a toothed flywheel mounted to said crankshaft;

whereby said engine back plate permits the relocation of said starter motor to allow attachment of said generator support bracket assembly to engines having a side mounted starter motor.

12. The generator support bracket assembly according to claim 1 wherein said conventional engine is a diesel engine having a displacement in a range of about 29.23 cu. in. to 43.88 cu. in., operating within a range of about 1800 rpm–3600 rpm and producing a maximum output within a range of about 12½ Hp to 18.8 Hp.

13. The generator support bracket assembly according to claim 12 wherein said conventional engine is further defined as a KUBOTA diesel engine.

14. The generator support bracket assembly according to claim 12 wherein said conventional engine is a KUBOTA diesel engine operated at about 2800 rpm and producing 5 KW of electrical power.

15. A generator support bracket assembly for securing a generator assembly to the side of a conventional engine, comprising:

an engine/generator mounting plate formed from a rigid plate having an engine side surface and a generator side surface and a first set of through holes strategically positioned for aligning said engine side surface in a vertical orientation to an engine employing mounting bolts for securing said engine/generator plate in a fixed position, and a second set of through holes strategically positioned for accepting a generator assembly to said generator side surface employing mounting bolts for securing said generator assembly in a fixed position;

an engine mount having a vertical member with mounting holes positioned for securing to said engine and a horizontal member with mounting holes available for securing said engine mount to isolation mounts; and a generator mount having a vertical member with mounting holes positioned for securing to said generator and a horizontal member with mounting holes available for securing said generator mount to isolation mounts; and an engine back plate constructed from a rigid metal plate having an oDenina for a disposed crankshaft and an opening for a starter motor, said starter motor opening strategically positioned to permit placement of said starter motor in a position for engagement of a toothed flywheel mounted to said crankshaft.

16. The generator support bracket assembly according to claim 15 wherein said engine/generator plate is constructed from a single piece of aluminum having a thickness of about 1.5 inches.

17. The generator support bracket assembly according to claim 15 wherein said engine mount is formed from a single piece of rigid angle steel having thickness of about 3/16 inch with a vertical member that includes a first side edge formed inwardly angular to said horizontal member, and a second side edge having a first portion formed inwardly angular to said horizontal member and a second portion formed perpendicular to said horizontal member, said vertical member having a height of about 5.25 inches and said horizontal member of said engine mount has a length of about 15 inches.

18. The generator support bracket assembly according to claim 15 wherein said generator mount is formed from a single piece of rigid angle steel having thickness of about 3/16 inch with a vertical member that includes a first side edge formed perpendicular to said horizontal member, and a second side edge formed inwardly angular to said horizontal member, said vertical member having a height of about 7.5 inches and said horizontal member of said engine mount having a length of about 15 inches.

19. The generator support bracket assembly according to claim 15 wherein said engine rotates a generator shaft on said generator assembly by use of a synchronous belt and socket.

20. The generator support bracket assembly according to claim 15 wherein said engine rotates a generator shaft on said generator assembly by use of a synchronous belt and socket.

21. The generator support bracket assembly according to claim 15 wherein said engine back plate includes a top edge having a curvature for support of a fuel pump and an outwardly extending surface to provide a support for securing a cover thereto.

22. The generator support bracket assembly securing a generator assembly to the side of a conventional engine in according with claim 12 wherein said conventional engine is a diesel engine having a displacement in a range of about 29.23 cu. in. to 43.88 cu. in., operating within a range of about 1800 rpm–3600 rpm and producing a maximum output within a range of about 12½ Hp to 18.8 Hp.

23. The generator support bracket assembly according to claim 22 wherein said conventional engine is further defined as a KUBOTA diesel engine.

24. The generator support bracket assembly according to claim 22 wherein said conventional engine is a KUBOTA diesel engine operated at about 2800 rpm and producing 5 KW of electrical power.

* * * * *